US011968512B2

(12) United States Patent
Ho et al.

(10) Patent No.: US 11,968,512 B2
(45) Date of Patent: Apr. 23, 2024

(54) SPEAKER DEVICES WITH DUAL-TRANSDUCERS

(71) Applicant: Hewlett-Packard Development Company, L.P., Spring, TX (US)

(72) Inventors: Yen-Hsin Ho, Taipei (TW); Yi-Ying Lai, Taipei (TW); Chen-Hui Hu, Taipei (TW); Chen-Yu Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 17/846,063

(22) Filed: Jun. 22, 2022

(65) Prior Publication Data

US 2023/0421961 A1 Dec. 28, 2023

(51) Int. Cl.

*H04R 9/02* (2006.01)
*H04R 1/02* (2006.01)
*H04R 9/06* (2006.01)

(52) U.S. Cl.

CPC ............... *H04R 9/025* (2013.01); *H04R 1/02* (2013.01); *H04R 9/063* (2013.01); *H04R 2209/026* (2013.01)

(58) Field of Classification Search

CPC ... H04R 1/02; H04R 1/24; H04R 1/40; H04R 1/403; H04R 1/28; H04R 1/2826; H04R 1/2896; H04R 9/02; H04R 9/025; H04R 9/04; H04R 9/046; H04R 9/047; H04R 9/06; H04R 9/063; H04R 7/12; H04R 19/02; H04R 2209/026; H04R 2209/041

See application file for complete search history.

(56) References Cited

U.S. PATENT DOCUMENTS

| | | | | |
|---|---|---|---|---|
| 7,570,779 | B2 | 8/2009 | Sugiura | |
| 8,447,063 | B2 | 5/2013 | Chu | |
| 10,631,096 | B1 * | 4/2020 | Garcia Selva | H04R 9/06 |
| 11,076,237 | B2 | 7/2021 | Cho et al. | |
| 2007/0003080 | A1 | 1/2007 | Takayama et al. | |

(Continued)

FOREIGN PATENT DOCUMENTS

| | | | | |
|---|---|---|---|---|
| CN | 208987157 U | * 6/2019 | | H04R 1/20 |
| CN | 214014517 U | * 8/2021 | | H04R 5/02 |

(Continued)

OTHER PUBLICATIONS

English Translation of JP-2000184482-A. Date Jun. 2000.*
English Translation of JP-H1141686-A. Date Feb. 1999.*

*Primary Examiner* — Thang V Tran
(74) *Attorney, Agent, or Firm* — Knobbe, Martens, Olson & Bear, LLP

(57) ABSTRACT

In an example, a speaker device may include a first transducer and a second transducer. The first transducer may include a first diaphragm, a first magnetic circuit, and a first voice coil disposed in a magnetic gap of the first magnetic circuit to cause vibration of the first diaphragm. The second transducer may include a second diaphragm, a second magnet circuit, and a second voice coil disposed in a magnetic gap of the second magnetic circuit to cause vibration of the second diaphragm. Further, the speaker device may include a magnetic plate having a first surface coupled to the first transducer and a second surface coupled to the second transducer. The first surface is opposite to the second surface.

19 Claims, 9 Drawing Sheets

(56) References Cited

U.S. PATENT DOCUMENTS

| | | | | |
|---|---|---|---|---|
| 2008/0317255 | A1* | 12/2008 | Cozens | H04R 9/10<br>381/182 |
| 2020/0145761 | A1 | 5/2020 | Cho et al. | |
| 2020/0221214 | A1 | 7/2020 | Mordechai | |
| 2022/0150641 | A1* | 5/2022 | Ko | H04R 1/02 |
| 2022/0322013 | A1* | 10/2022 | Lv | H04R 7/12 |
| 2022/0360903 | A1* | 11/2022 | Huang | H04R 9/025 |
| 2023/0008436 | A1* | 1/2023 | Chang | H04R 1/227 |
| 2023/0224641 | A1* | 7/2023 | Tong | H04R 9/04<br>381/412 |
| 2023/0232156 | A1* | 7/2023 | Tong | H04R 9/025<br>381/182 |
| 2023/0319463 | A1* | 10/2023 | Zheng | H04R 1/1008 |

FOREIGN PATENT DOCUMENTS

| | | | | | |
|---|---|---|---|---|---|
| JP | H1141686 | A | * | 2/1999 | H04R 1/02 |
| JP | 2000184482 | A | * | 6/2000 | H04R 1/02 |
| JP | 3790528 | B2 | * | 6/2006 | H04R 1/28 |

* cited by examiner

SPEAKER DEVICES WITH DUAL-TRANSDUCERS

BACKGROUND

With an increasing use of electronic devices, such as smartphones, laptops, televisions, and the like, modules that perform various functions have come to be provided in such electronic devices. For example, an electronic device may include a speaker module in order to output various sounds. The speaker module may convert an electric signal generated by the electronic device into a sound that can be heard by a user, and thus may output the sound. Such speaker modules comprise a vibration system and a magnetic circuit driving the vibration system to vibrate. The vibration system may include a vibrating diaphragm and a voice coil driving the vibrating diaphragm.

BRIEF DESCRIPTION OF THE DRAWINGS

Examples are described in the following detailed description and in reference to the drawings, in which.

DETAILED DESCRIPTION

Figure 1A:
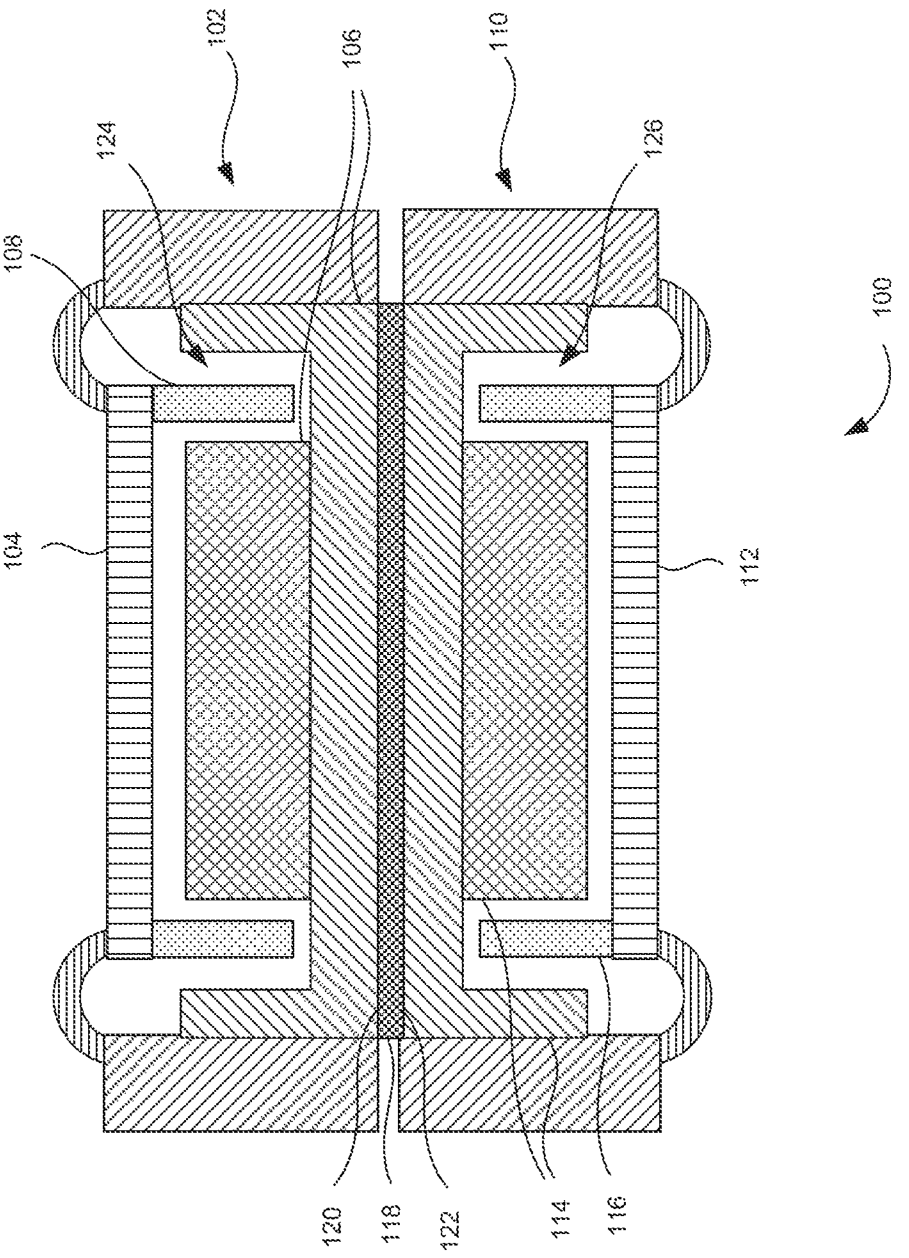
FIG. 1A is a schematic cross-sectional side view of an example speaker device, depicting a back-to-back arrangement of a first transducer and a second transducer via a magnetic plate.

Electronic devices, such as mobile phones, personal digital assistants (PDAs), and laptop computers, are widely used. Such electronic devices use speaker devices for the playback of audio signals. A speaker device may include a frame, a vibration unit fixed to the frame, and a magnetic circuit to drive the vibration unit to vibrate to generate sound and having a magnetic gap. The vibration unit may include a diaphragm and a voice coil inserted in the magnetic gap to drive the diaphragm to vibrate. The voice coil is fixedly supported by the vibrating diaphragm. The magnetic circuit may include a yoke and a magnet fixed to an interior of the yoke and spaced apart from the yoke to form the magnetic gap. The yoke is fixed to the frame. The speaker device may include a housing for receiving the vibration unit and the magnetic circuit therein.

The vibration unit and the magnetic circuit are directly connected with a sound quality of the speaker device. The speaker device vibrates due to the mechanical force produced by the voice coil. The current passing through the voice coil interacts with the magnetic field of the magnet to cause the vibration of the voice coil and the diaphragm. In some instances, the vibration of the voice coil and the diaphragm is unbalanced. For example, the unbalanced vibration of the diaphragm may occur due to an unbalanced atmospheric pressure on two sides of the diaphragm or the like. The unbalanced vibration may cause distortion of the sound emitted by the speaker device, and as a result, sound quality of the speaker device can be degraded. In this case, the power may have to be reduced to balance the vibration unit, and therefore the power of the vibration unit may be limited. Thus, the acoustic performance of the speaker device that uses the vibration unit may be limited.

Examples described herein may provide a speaker device that includes a first transducer, a second transducer, and a magnetic plate coupled between the first transducer and the second transducer. The first transducer may include a first magnetic circuit having a first magnet and a first yoke, a first voice coil disposed in a magnetic gap between the first magnet and the first yoke, and a first diaphragm connected to the first voice coil. The second transducer may include a second magnetic circuit having a second magnet and a second yoke, a second voice coil disposed in a magnetic gap between the second magnet and the second yoke, and a second diaphragm connected to the second voice coil. The magnetic plate may be coupled between the first yoke and the second yoke to connect magnetic flux between the first transducer and the second transducer. Thus, the back-to-back arrangement of the first transducer and the second transducer described herein can balance the mechanical force and significantly reduce the vibration of the first diaphragm and the second diaphragm.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a schematic cross-sectional side view of an example speaker device 100, depicting a back-to-back arrangement of a first transducer 102 and a second transducer 110 via a magnetic plate 118. Speaker device 100 may be used in a range of electronic devices such as a laptop, a smartphone, a tablet, a television, and the like.

As shown in FIG. 1A, speaker device 100 includes first transducer 102, second transducer 110, and magnetic plate 118 to couple first transducer 102 and second transducer 110. In an example, first transducer 102 includes a first diaphragm 104, a first magnetic circuit 106, and a first voice coil 108 disposed in a magnetic gap 124 of first magnetic circuit 106 to cause vibration of first diaphragm 104.

Further, second transducer 110 includes a second diaphragm 112, a second magnet circuit 114, and a second voice coil 116 disposed in a magnetic gap 126 of second magnetic circuit 114 to cause vibration of second diaphragm 112. First diaphragm 104 and second diaphragm 112 may generate sound by vibrating together with first voice coil 108 and second voice coil 116, respectively. Furthermore, magnetic plate 118 includes a first surface 120 coupled to first transducer 102 and a second surface 122 coupled to second transducer 110. In this example, first surface 120 is opposite to second surface 122. For example, magnetic plate 118 may include ferromagnetic material.

In an example, first transducer 102 may be disposed on first surface 120 of magnetic plate 118 to output sound in a first direction and second transducer 110 may be disposed on second surface 122 of magnetic plate 118 to output sound in a second direction that is opposite to the first direction. Further, magnetic plate 118 may couple magnetic flux generated from first magnetic circuit 106 and second magnetic circuit 114 between first transducer 102 and second transducer 110. In this example, the magnetic flux may pass through magnetic plate 118 between first transducer 102 and second transducer 110.

For example, a magnetic circuit (e.g., first magnetic circuit 106 and second magnetic circuit 114) may include a permanent magnet and magnetically permeable components, such as a yoke and top or bottom plates, so that the magnetic field is directed from a north pole of the magnet, through the magnetic permeable components, back to the south pole of the magnet. A voice coil is movably disposed within a gap in the magnetic circuit, wherein an edge of the voice coil is attached to a diaphragm. As electric current is fed to the voice coil, according to Fleming's left-hand rule, another magnetic field is created, vibrating the voice coil either in the same direction or opposed to the magnetic field generated by the magnetic circuit. Accompanying this, the diaphragm connected to the voice coil is driven to reproduce sound. An example first magnetic circuit 106 and second magnetic circuit 114 is depicted in FIG. 1B.

Figure 1B:
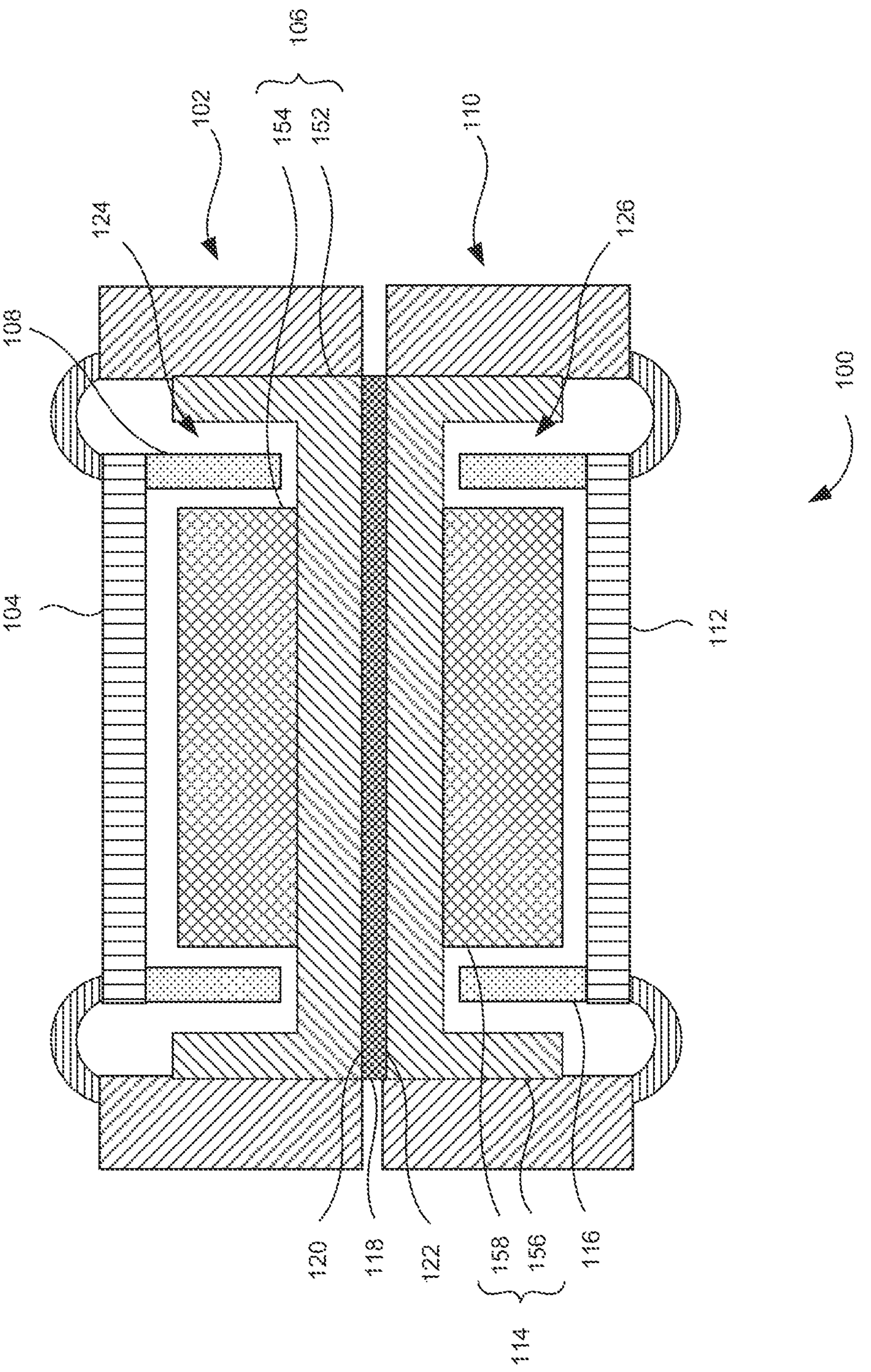
FIG. 1B is a schematic cross-sectional side view of the example speaker device of FIG. 1A, depicting additional features.

FIG. 1B is a schematic cross-sectional side view of example speaker device 100 of FIG. 1A, depicting additional features. For example, similarly named elements of FIG. 1B may be similar in structure and/or function to elements described with respect to FIG. 1A. As shown in FIG. 1B, first magnetic circuit 106 includes a first yoke 152 and a first magnet 154 disposed on first yoke 152. The magnetic gap (e.g., magnetic gap 124) of first magnetic circuit 106 may be formed between first yoke 152 and first magnet 154. First yoke 152 may fix first magnet 154. In an example, first yoke 152 may be made of a material having a high magnetic conductivity (e.g., SUS430, SUS304, or SPCC). First magnet 154 may be mounted on first yoke 152 in a horizontal plane to form a magnetic field. First magnet 154 may include, for example, a neodymium magnet, an alnico magnet, or the like. First magnet 154 may cause first voice coil 108 to vibrate up and down according to Fleming's left-hand rule, which in turn causes vibration of first diaphragm 104.

Further, second magnetic circuit 114 includes a second yoke 156 and a second magnet 158 disposed on second yoke 156. In this example, the magnetic gap (e.g., magnetic gap 126) of second magnetic circuit 114 may be formed between second yoke 156 and second magnet 158. Second yoke 156 may fix second magnet 158. In an example, second yoke 156 may be made of a material having a high magnetic conductivity (e.g., SUS430, SUS304, or SPCC). Second magnet 158 may be mounted on second yoke 156 in a horizontal plane to form a magnetic field. Second magnet 158 may include, for example, a neodymium magnet, an alnico magnet, or the like. Second magnet 158 may cause second voice coil 116 to vibrate up and down according to Fleming's left-hand rule, which in turn causes vibration of second diaphragm 112. The back-to-back arrangement of first transducer 102 and second transducer 110 described herein can balance the mechanical force and reduce the unbalanced vibration of first diaphragm 104 and second diaphragm 112.

Figure 2A:
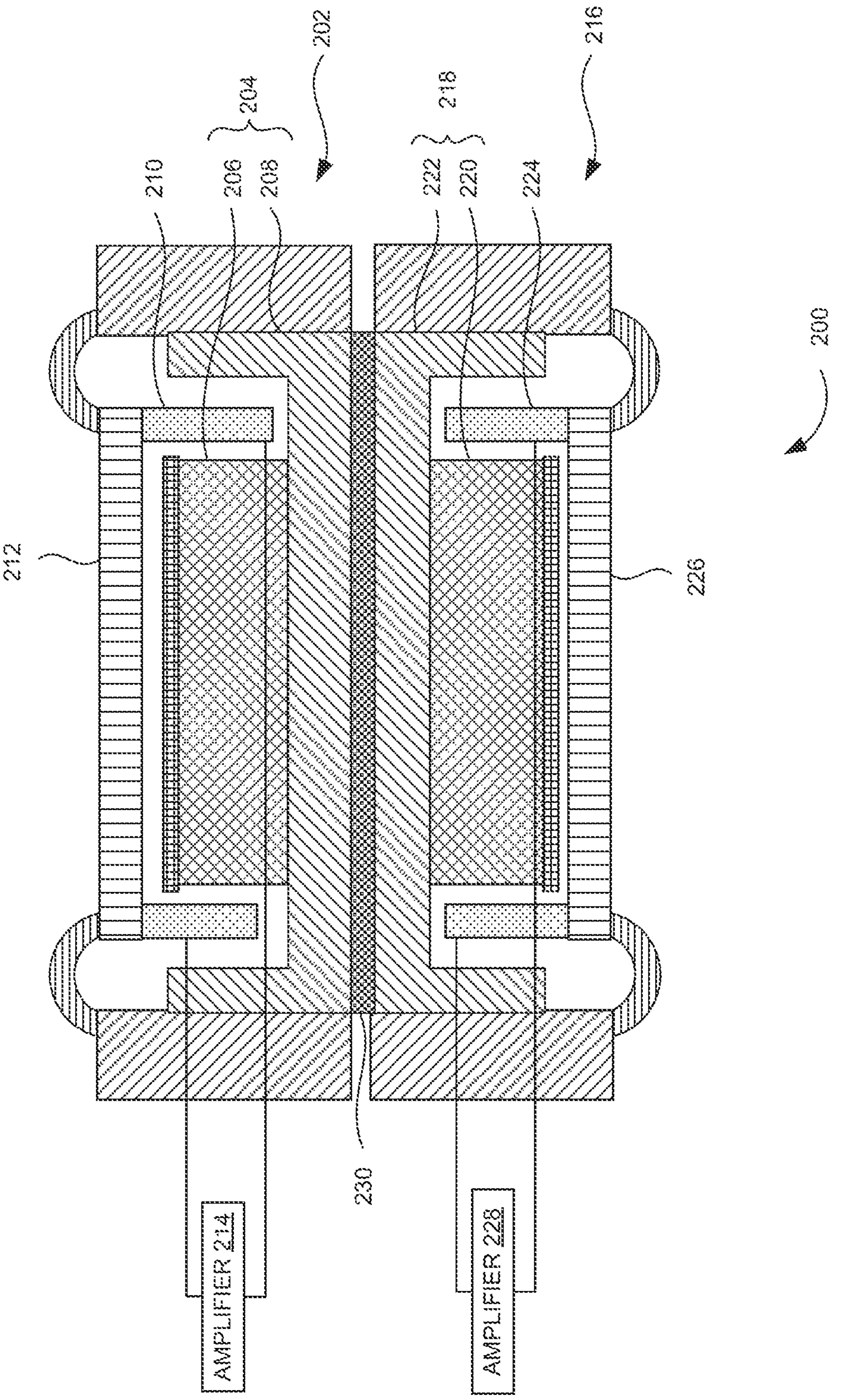
FIG. 2A is a schematic cross-sectional side view of an example speaker device, depicting a first amplifier and a second amplifier to separately drive a first transducer and a second transducer, respectively.

FIG. 2A is a schematic cross-sectional side view of an example speaker device 200, depicting a first amplifier 214 and a second amplifier 228 to separately drive a first transducer 202 and a second transducer 216, respectively. As shown in FIG. 2A, speaker device 200 includes first transducer 202, second transducer 216, first amplifier 214 electrically connected to first transducer 202, second amplifier 228 electrically connected to second transducer 216, and a magnetic plate 230 magnetically coupled between first transducer 202 and second transducer 216.

First transducer 202 includes a first magnetic circuit 204 having a first magnet 206 and a first yoke 208. Further, first transducer 202 includes a first voice coil 210 disposed in a first magnetic gap between first magnet 206 and first yoke 208. Furthermore, first transducer 202 includes a first diaphragm 212 connected to first voice coil 210. For example, a first end portion (e.g., an upper end portion) of first voice coil 210 is attached to first diaphragm 212 and a second end portion (e.g., a lower end portion) of first voice coil 210 is disposed in the first magnetic gap. Also, first transducer 202 includes first amplifier 214 electrically connected to first voice coil 210. First voice coil 210 may be formed by a wire wound on an axis arranged on an inner surface of first diaphragm 212. First voice coil 210 may vibrate through an interaction with first magnet 206 by an electric signal applied from amplifier 214 and vibrate first diaphragm 212.

Second transducer 216 includes a second magnetic circuit 218 having a second magnet 220 and a second yoke 222. Further, second transducer 216 includes a second voice coil 224 disposed in a second magnetic gap between second magnet 220 and second yoke 222. Furthermore, second transducer 216 includes a second diaphragm 226 connected to second voice coil 224. For example, a first end portion (e.g., an upper end portion) of second voice coil 224 is attached to second diaphragm 226 and a second end portion (e.g., a lower end portion) of second voice coil 224 is disposed in the second magnetic gap. Also, second transducer 216 includes a second amplifier 228 electrically connected to second voice coil 224. Second voice coil 224 may be formed by a wire wound on an axis arranged on an inner surface of second diaphragm 226. Second voice coil 224 may vibrate through an interaction with second magnet 220 by an electric signal applied from amplifier 228 and vibrate second diaphragm 226.

Further, magnetic plate 230 is coupled between first yoke 208 and second yoke 222 to couple magnetic flux between first transducer 202 and second transducer 216. In an example, magnetic plate 230 may have a thickness less than a thickness of first yoke 208 and second yoke 222. In an example, first transducer 202 may include a size different from a size of second transducer 216. For example, the size of first transducer 202 may be less than the size of second transducer 216. In another example, first transducer 202 and second transducer 216 are of equal size.

First amplifier 214 and second amplifier 228 may control power to first transducer 202 and second transducer 216, respectively, based on the size of first transducer 202 and second transducer 216. Since individual amplifiers 214 and 228 can be used to drive transducers 202 and 216 separately, the power to transducers 202 and 216 can be controlled to balance the mechanical force from transducers 202 and 216 with varied sizes. The back-to-back transducer design with different sizes of first transducer 202 and second transducer 216 may provide flexibility and compatibility with different types of electronic devices.

Figure 2B:
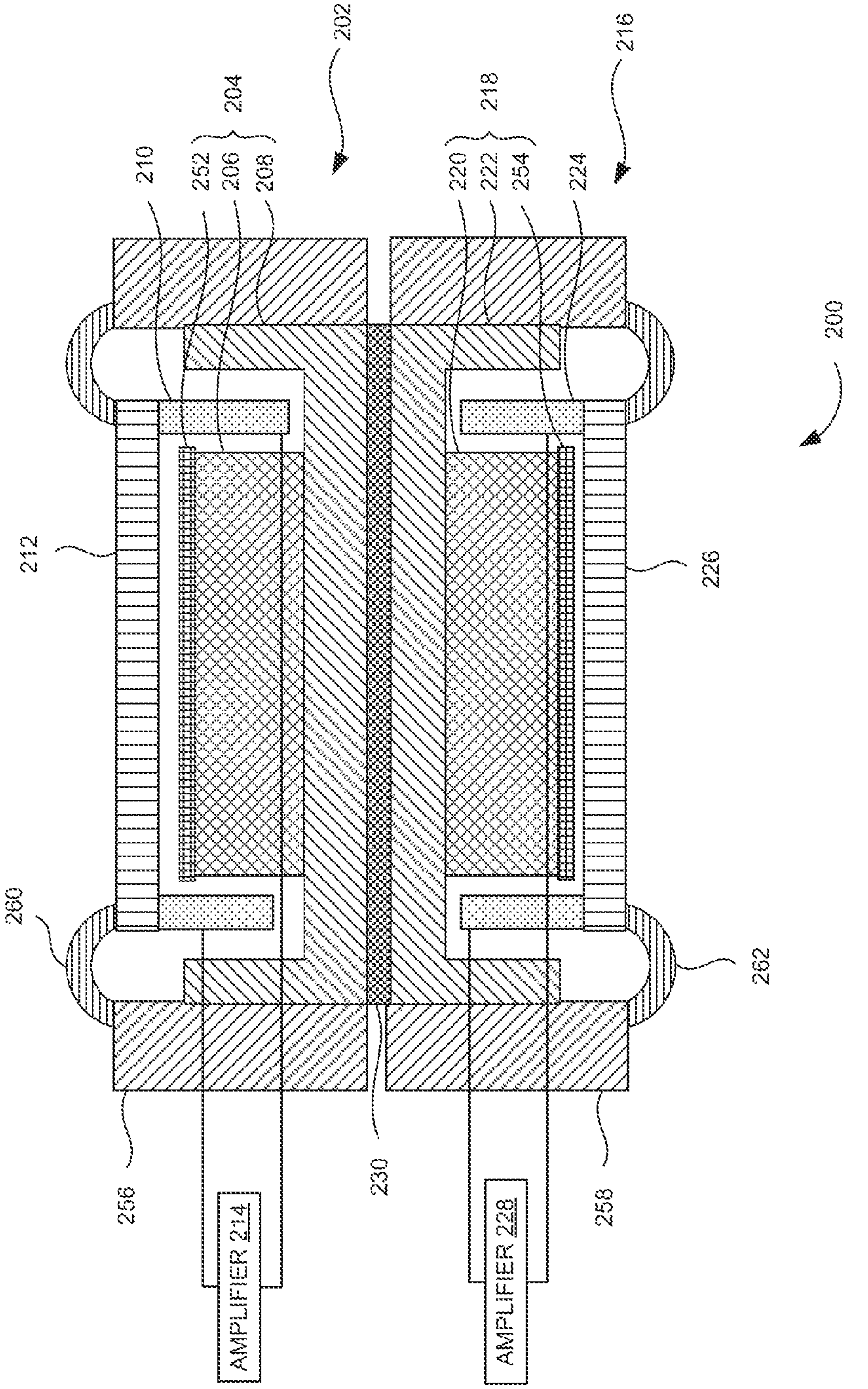
FIG. 2B is a schematic cross-sectional side view of the example speaker device of FIG. 2A, depicting additional features.

FIG. 2B is a schematic cross-sectional side view of example speaker device 200 of FIG. 2A, depicting additional features. For example, similarly named elements of FIG. 2B may be similar in structure and/or function to elements described with respect to FIG. 2A. As shown in FIG. 2B, first magnetic circuit 204 includes a first plate 252 magnetically coupled to first magnet 206 opposite first yoke 208 and defining the first magnetic gap between first plate 252 and first yoke 208. In this example, first magnet 206 may include a top portion and a bottom portion in a horizontal plane such that first plate 252 is magnetically coupled to first magnet 206 in the top portion and first yoke 208 is magnetically coupled to first magnet 206 in the bottom portion.

Further, second magnetic circuit 216 includes a second plate 254 magnetically coupled to second magnet 220 opposite second yoke 222 and defining the second magnetic gap between second plate 254 and second yoke 222. In this example, second magnet 220 may include a top portion and a bottom portion in a horizontal plane such that second plate 254 is magnetically coupled to second magnet 220 in the top portion and second yoke 222 is magnetically coupled to second magnet 220 in the bottom portion.

First plate 252 and second plate 254 may perform a function of collecting a magnetic field generated by first magnet 206 and second magnet 220, respectively. First plate 252 and second plate 254 may include a material (e.g., SUS430, SUS304, or SPCC) having a high magnetic conductivity. For example, the magnetic flux generated in first magnet 206 may form a path of a magnetic flux coming to first yoke 208 through first plate 252 and the magnetic flux generated in second magnet 220 may form a path of a magnetic flux coming to second yoke 222 through second plate 254.

Furthermore, first transducer 202 includes a first frame 256 to form a side surface of first transducer 202. First diaphragm 212 may be disposed at a front side of first frame 256 and first magnetic circuit 204 may be disposed at a rear side of first frame 256. In an example, first frame 256 may support first diaphragm 212 via a first elastic member 260 to facilitate vibration of first diaphragm 212.

Second transducer 216 includes a second frame 258 to form a side surface of second transducer 216. Second diaphragm 226 may be disposed at a front side of second frame 258 and second magnetic circuit 218 may be disposed at a rear side of second frame 258. In an example, second frame 258 may support second diaphragm 226 via a second elastic member 262 to facilitate vibration of second diaphragm 226. For example, first frame 256 and second frame 258 may include plastic. Further, speaker device 200 may include a housing to accommodate first transducer 202, second transducer 216, and magnetic plate 230.

Figure 3A:
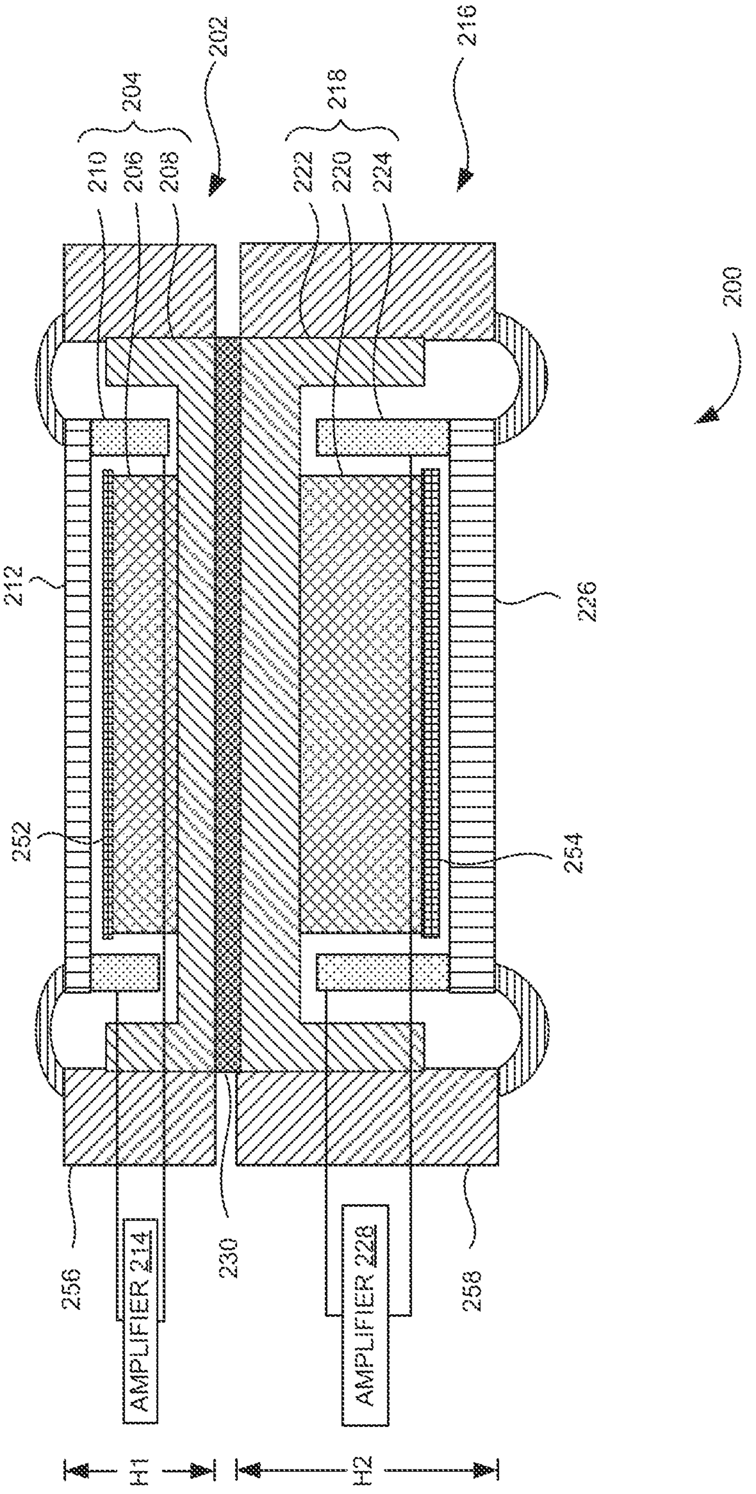
FIGS. 3A and 3B are schematic cross-sectional side views of the example speaker device of FIG. 2B, depicting additional features.
Figure 3B:
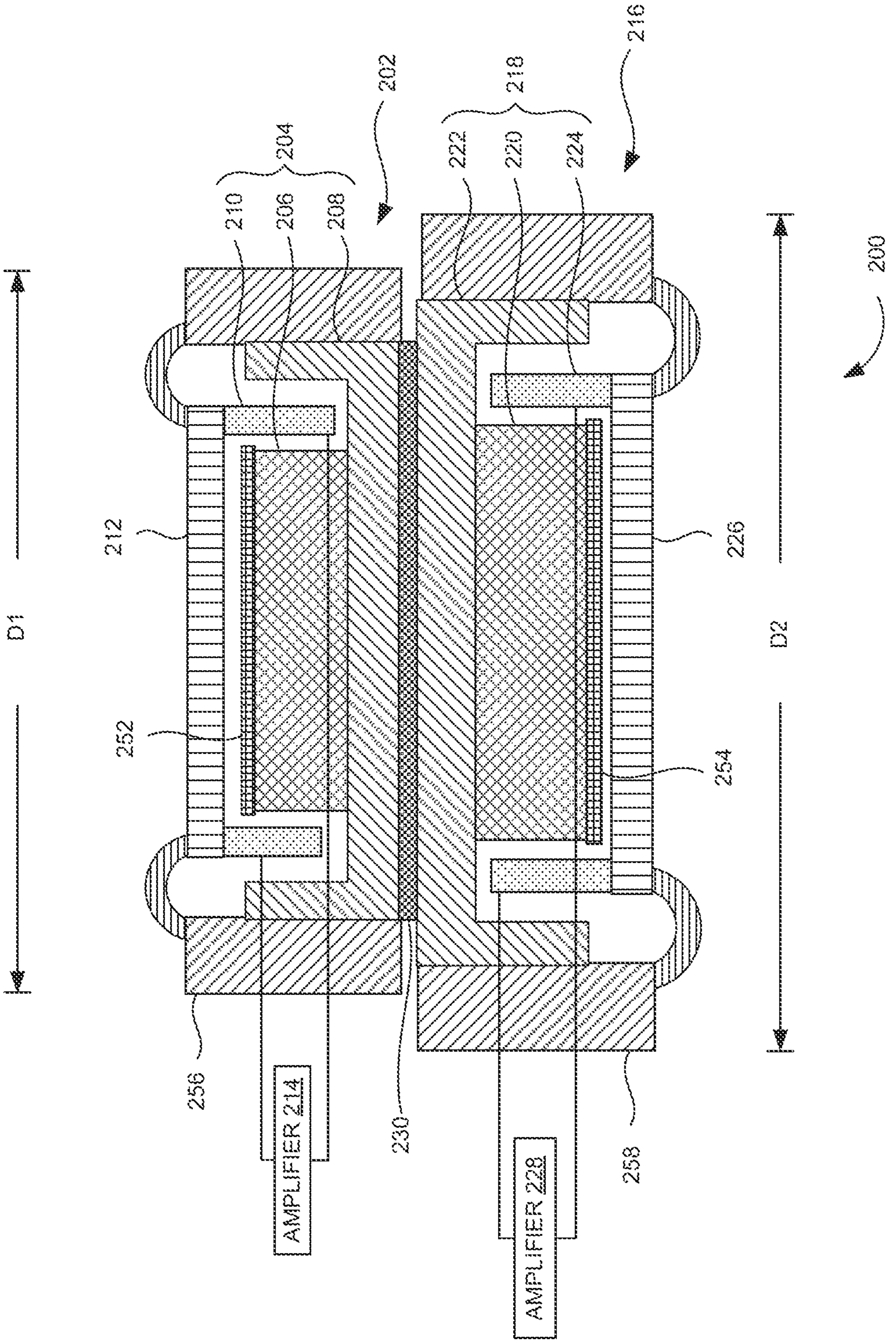

FIGS. 3A and 3B are schematic cross-sectional side views of example speaker device 200 of FIG. 2B, depicting additional features. For example, similarly named elements of FIGS. 3A and 3B may be similar in structure and/or function to elements described with respect to FIG. 2B. In the example shown in FIG. 3A, a width or height (H1) of first transducer 202 is less than a width or height (H2) of second transducer 216. In the example shown in FIG. 3B, a diameter (D1) of first transducer 202 is less than a diameter (D2) of second transducer 216.

Figure 4:
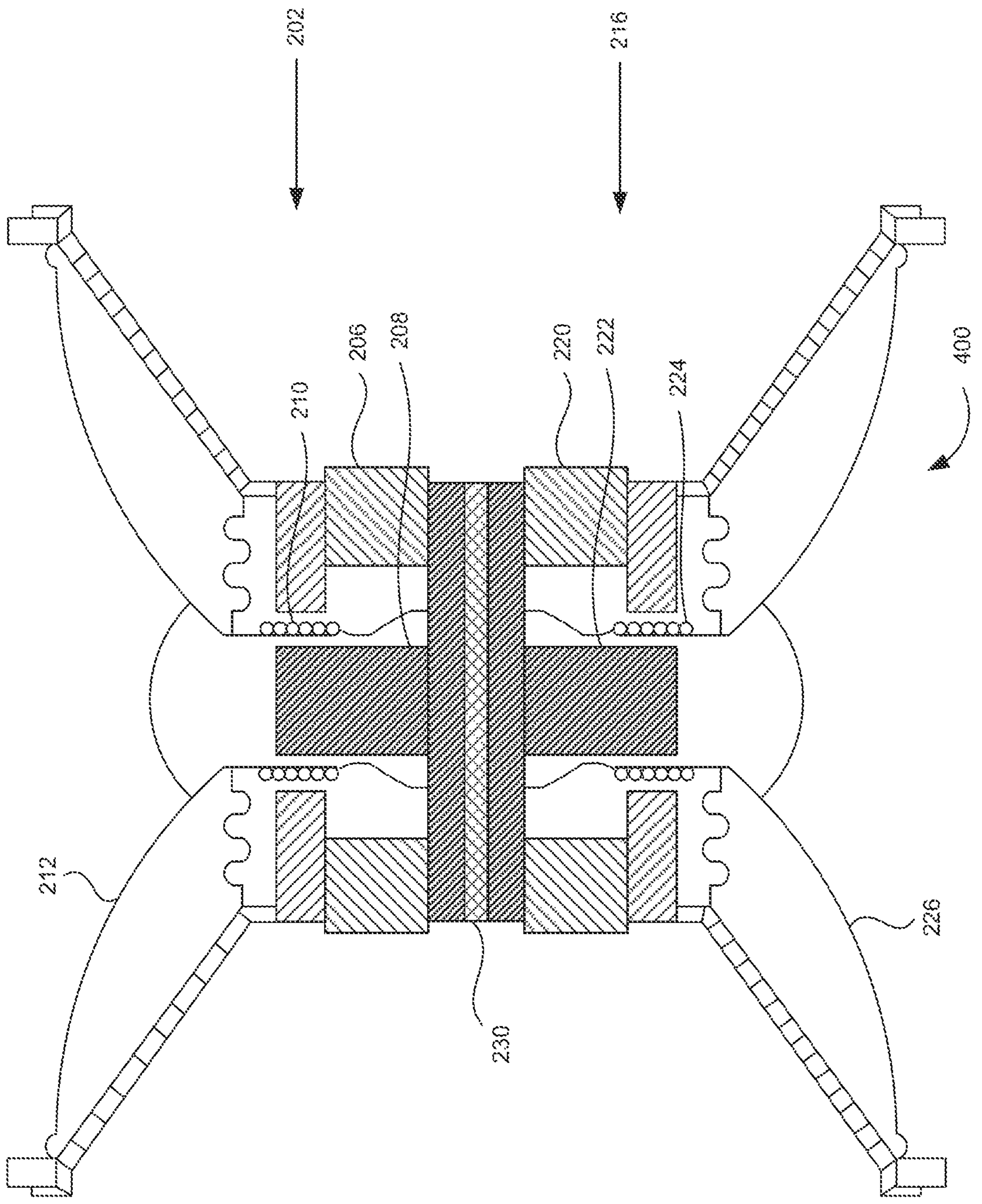
FIG. 4 is a schematic cross-sectional side view of another example speaker device, depicting magnetic plate disposed between a first transducer and a second transducer.

FIG. 4 is a schematic cross-sectional side view of another example speaker device 400, depicting magnetic plate 230 disposed between first transducer 202 and second transducer 216. For example, similarly named elements of FIG. 4 may be similar in structure and/or function to elements described with respect to FIGS. 3A and 3B. In the example shown in FIG. 4, first yoke 208 is surrounded by first magnet 206 such that the first magnetic gap is in between first magnet 206 and first yoke 208. Further, second yoke 222 is surrounded by second magnet 220 such that the second magnetic gap is in between second magnet 220 and second yoke 222. The design of speaker device 400 of FIG. 4 can be implemented in loudspeakers. In another example (e.g., as shown in FIGS. 2A, 2B, 3A, and 3B), first magnet 206 is surrounded by first yoke 208 such that the first magnetic gap is in between first magnet 206 and first yoke 208. Further, second magnet 220 may be surrounded by second yoke 222 such that the second magnetic gap is in between second magnet 220 and second yoke 222.

Figure 5A:
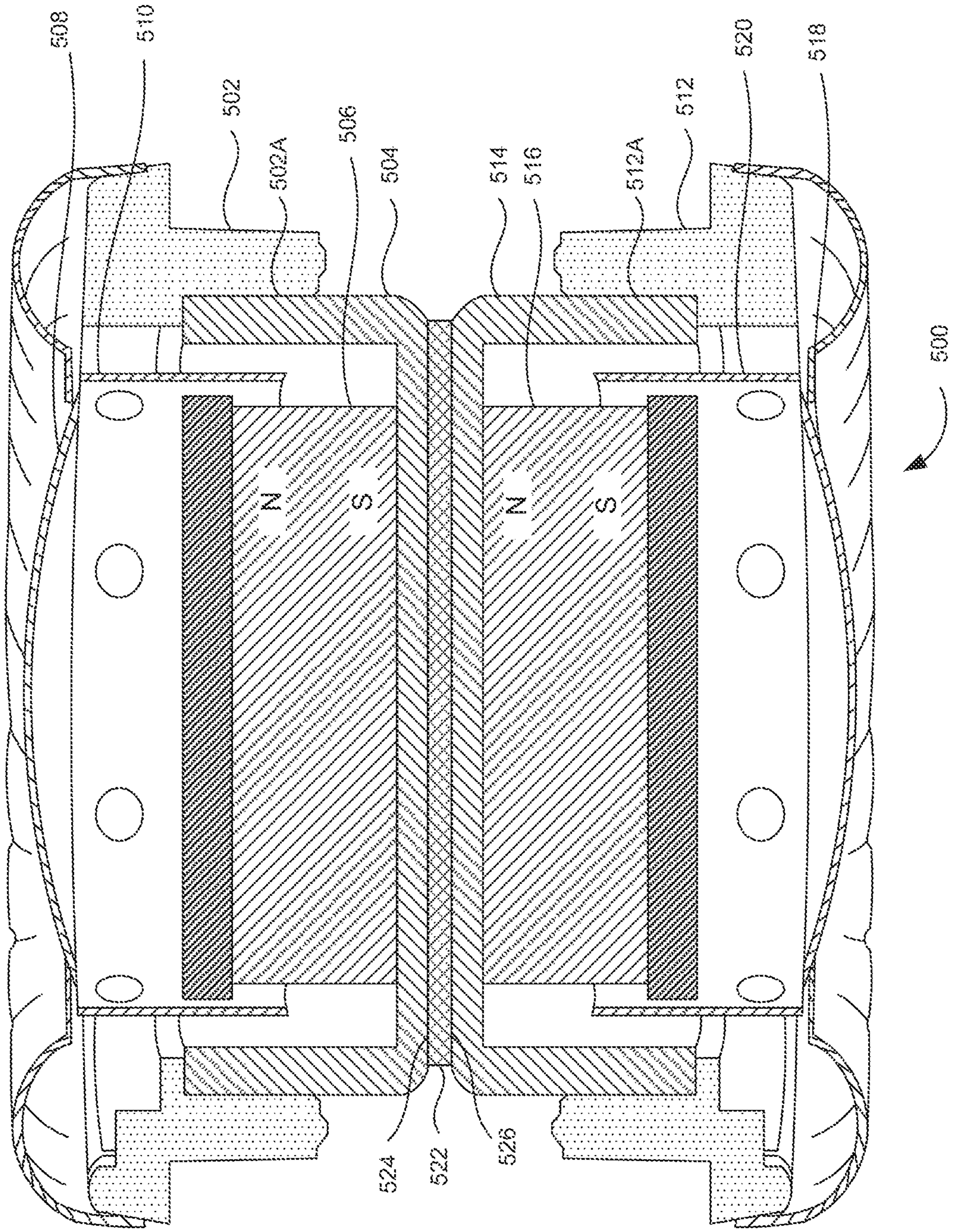
FIG. 5A is a cross-sectional side view of an example speaker device, depicting a magnetic plate to magnetically couple a first yoke to a second yoke.
Figure 5B:
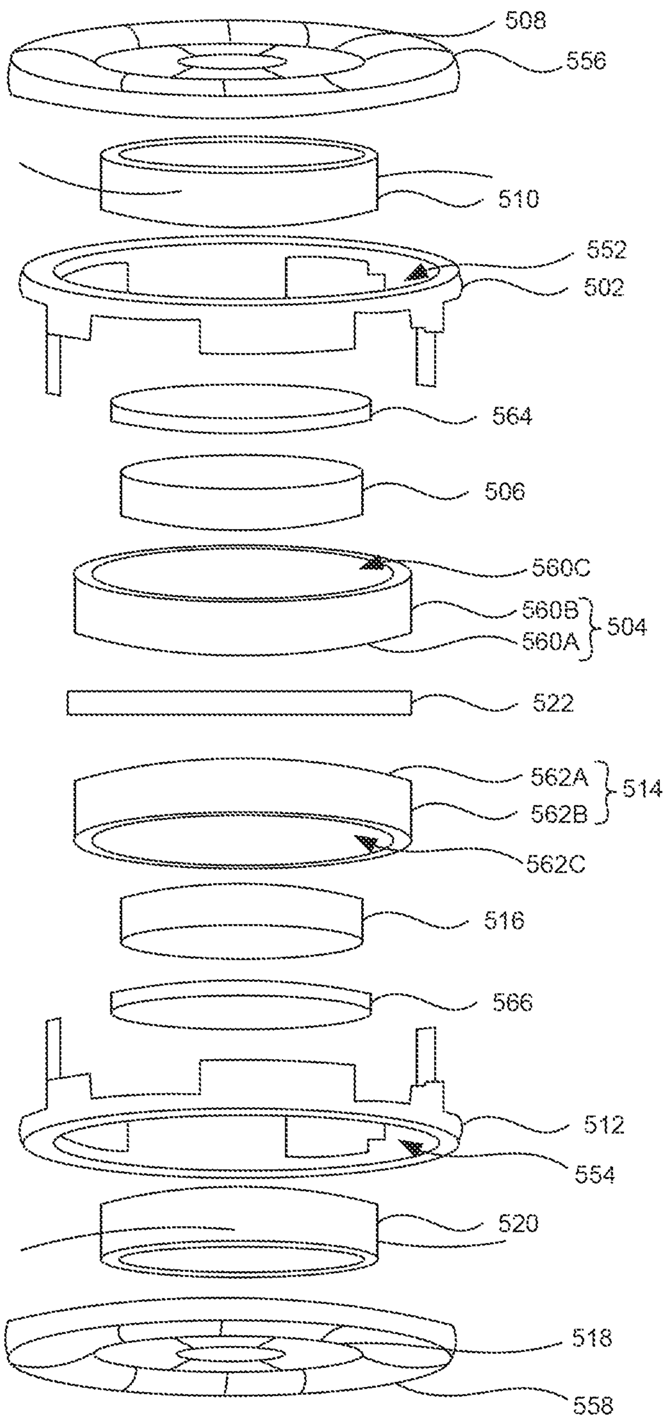
FIG. 5B is an exploded view of the example speaker device of FIG. 5A, depicting additional features.

FIG. 5A is a cross-sectional side view of an example speaker device 500, depicting a magnetic plate 522 to magnetically couple a first yoke 504 to a second yoke 514. As shown in FIG. 5A, speaker device 500 includes a first frame 502 having an opening (e.g., an opening 552 as shown in FIG. 5B). Further, speaker device 500 includes first yoke 504 coupled to an inner periphery 502A of first frame 502.

Furthermore, speaker device 500 includes a first magnet 506 disposed on first yoke 504. In an example, first magnet 506 may include a north pole and a south pole. In this example, the south pole of first magnet 506 is disposed on first yoke 504. Also, speaker device 500 includes a first diaphragm 508 supported by first frame 502. In addition, speaker device 500 includes a first voice coil 510 connected to first diaphragm 508 to cause vibrations of first diaphragm 508.

Further, speaker device 500 includes a second frame 512 having an opening (e.g., an opening 554 as shown in FIG. 5B). Furthermore, speaker device 500 includes second yoke 514 coupled to an inner periphery 512A of second frame 512 and a second magnet 516 disposed on second yoke 514. In an example, second magnet 516 may include a north pole and a south pole. In this example, the north pole of second magnet 516 is disposed on second yoke 514. Also, speaker device 500 includes a second diaphragm 518 supported by second frame 512. In addition, speaker device 500 includes a second voice coil 520 connected to second diaphragm 518 to cause vibrations of second diaphragm 518.

Further, speaker device 500 includes magnetic plate 522 having a first surface 524 magnetically coupled to first yoke 504 (e.g., opposite first magnet 506) and a second surface 526 magnetically coupled to second yoke 514 (e.g., opposite second magnet 516). First surface 524 is opposite to second surface 526.

FIG. 5B is an exploded view of example speaker device 500 of FIG. 5A, depicting additional features. For example, similarly named elements of FIG. 5B may be similar in structure and/or function to elements described with respect to FIG. 5A. As shown in FIG. 5B, speaker device 500 includes a first elastic member 556 connected between first frame 502 and first diaphragm 508 and a second elastic member 558 connected between second frame 512 and second diaphragm 518. First elastic member 556 may connect an outer side of first diaphragm 508 to first frame 502, so that a vibration in a vibration direction of first diaphragm 508 can be possible. Similarly, second elastic member 558 may connect an outer side of second diaphragm 518 to second frame 512, so that a vibration in a vibration direction of second diaphragm 518 can be possible. In the example shown in FIGS. 5A and 5B, first elastic member 556 and second elastic member 558 illustrate a form connected to an outside of first frame 502 and second frame 512, respectively, but the installation position of first elastic member 556 and second elastic member 558 may be changed.

Further, first yoke 504 includes a bottom surface 560A and a side wall 560B disposed on bottom surface 560A defining an opening 560C. In this example, first magnet 506 may be disposed on bottom surface 560A via opening 560C and first voice coil 510 may be disposed in a first magnetic gap between first magnet 506 and side wall 560B of first yoke 504. Second yoke 514 includes a bottom surface 562A and a side wall 562B disposed on bottom surface 562A defining an opening 562C. In this example, second magnet 516 may be disposed on bottom surface 562A via opening 562C and second voice coil 520 may be disposed in a second magnetic gap between second magnet 516 and side wall 562B of second yoke 514. First voice coil 510 may be in the form of a coil wound on the outer surface of the cylindrical bobbin, where one end is attached to an inner surface of first diaphragm 508. Second voice coil 520 may be in the form of a coil wound on the outer surface of the cylindrical bobbin, where one end is attached to an inner surface of second diaphragm 518. An alternate current in an audible frequency band can be separately applied to first voice coil 510 and second voice coil 520 via respective amplifiers.

Furthermore, speaker device 500 includes a first plate 564 that can be magnetically coupled to first magnet 506 opposite first yoke 504 and a second plate 566 that can be magnetically coupled to second magnet 516 opposite second yoke 514. Further, first frame 502 includes opening 552 to accommodate first yoke 504, first magnet 506, first plate 564, and first voice coil 510. Further, second frame 512 includes opening 554 to accommodate second yoke 514, second magnet 516, second plate 566, and second voice coil 520.

In some examples, first voice coil 510 and second voice coil 520 may include copper (Cu), first frame 502 and second frame 512 may include low-loss plastic material (e.g., polycarbonate), first magnet and second magnet may include neodymium magnet (NdFeB), and first yoke 504, second yoke 514, first plate 564, second plate 566, and magnetic plate 522 may include ferromagnetic materials (e.g., steel). In another example, first diaphragm 508 and second diaphragm 518 may be formed of various materials including a thin film material (e.g., polyether ether ketone (PEEK) and polyetherimide (PEI)) having thermoplastic properties, silicon, graphene, carbon, metal materials, or any combination thereof.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A speaker device comprising:
- a first transducer comprising:
  - a first diaphragm;
  - a first magnetic circuit; and
  - a first voice coil disposed in a magnetic gap of the first magnetic circuit to cause vibration of the first diaphragm;
- a second transducer comprising:
  - a second diaphragm;
  - a second magnetic circuit; and
  - a second voice coil disposed in a magnetic gap of the second magnetic circuit to cause vibration of the second diaphragm; and
- a magnetic plate having a first surface coupled to the first transducer and a second surface coupled to the second transducer, wherein the first surface is opposite to the second surface;
- wherein the magnetic plate is to couple magnetic flux generated from the first magnetic circuit and the second magnetic circuit between the first transducer and the second transducer.

2. The speaker device of claim 1, wherein the first magnetic circuit comprises:
- a first yoke; and
- a first magnet disposed on the first yoke, wherein the magnetic gap of the first magnetic circuit is formed between the first yoke and the first magnet.

3. The speaker device of claim 1, wherein the second magnetic circuit comprises:
- a second yoke; and
- a second magnet disposed on the second yoke, wherein the magnetic gap of the second magnetic circuit is formed between the second yoke and the second magnet.

4. The speaker device of claim 1, wherein the first transducer is disposed on the first surface of the magnetic plate to output sound in a first direction and the second transducer is disposed on the second surface of the magnetic plate to output sound in a second direction that is opposite to the first direction.

5. A speaker device comprising:
- a first transducer comprising:
  - a first magnetic circuit comprising a first magnet and a first yoke;
  - a first voice coil disposed in a first magnetic gap between the first magnet and the first yoke; and
  - a first diaphragm connected to the first voice coil;
- a first amplifier electrically connected to the first voice coil;
- a second transducer comprising:
  - a second magnetic circuit comprising a second magnet and a second yoke;
  - a second voice coil disposed in a second magnetic gap between the second magnet and the second yoke; and
  - a second diaphragm connected to the second voice coil;
- a second amplifier electrically connected to the second voice coil; and
- a magnetic plate coupled between the first yoke and the second yoke to couple magnetic flux between the first transducer and the second transducer.

6. The speaker device of claim 5, wherein the first magnetic circuit comprises:

a first plate magnetically coupled to the first magnet opposite the first yoke and defining the first magnetic gap between the first plate and the first yoke.

7. The speaker device of claim 5, wherein the second magnetic circuit comprises:

a second plate magnetically coupled to the second magnet opposite the second yoke and defining the second magnetic gap between the second plate and the second yoke.

8. The speaker device of claim 5, wherein the first transducer comprises:

a first frame to form a side surface of the first transducer, wherein the first diaphragm is disposed at a front side of the first frame and the first magnetic circuit is disposed at a rear side of the first frame.

9. The speaker device of claim 5, wherein the second transducer comprises:

a second frame to form a side surface of the second transducer, wherein the second diaphragm is disposed at a front side of the second frame and the second magnetic circuit is disposed at a rear side of the second frame.

10. The speaker device of claim 5, wherein the first transducer comprises a size different from a size of the second transducer.

11. The speaker device of claim 5, wherein the first transducer and the second transducer are of equal size.

12. The speaker device of claim 5, wherein the magnetic plate is to have a thickness less than a thickness of the first yoke and the second yoke.

13. The speaker device of claim 5, wherein the first magnet is surrounded by the first yoke such that the first magnetic gap is in between the first magnet and the first yoke, and wherein the second magnet is surrounded by the second yoke such that the second magnetic gap is in between the second magnet and the second yoke.

14. The speaker device of claim 5, wherein the first yoke is surrounded by the first magnet such that the first magnetic gap is in between the first magnet and the first yoke, and wherein the second yoke is surrounded by the second magnet such that the second magnetic gap is in between the second magnet and the second yoke.

15. The speaker device of claim 5, wherein the first amplifier and the second amplifier are to control power to the first transducer and the second transducer, respectively, based on a size of the first transducer and the second transducer.

16. A speaker device comprising:

a first frame having an opening;

a first yoke coupled to an inner periphery of the first frame;

a first magnet disposed on the first yoke;

a first diaphragm supported by the first frame;

a first voice coil connected to the first diaphragm to cause vibrations of the first diaphragm;

a second frame having an opening;

a second yoke coupled to an inner periphery of the second frame;

a second magnet disposed on the second yoke;

a second diaphragm supported by the second frame;

a second voice coil connected to the second diaphragm to cause vibrations of the second diaphragm; and a magnetic plate to couple magnetic flux generated from the first magnet and the second magnet between the first yoke and the second yoke, the magnetic plate comprising:

a first surface magnetically coupled to the first yoke; and a second surface magnetically coupled to the second yoke.

17. The speaker device of claim 16, further comprising:

a first elastic member connected between the first frame and the first diaphragm; and a second elastic member connected between the second frame and the second diaphragm.

18. The speaker device of claim 16, wherein the first voice coil is disposed in a first magnetic gap between the first magnet and a side wall of the first yoke, and wherein the second voice coil is disposed in a second magnetic gap between the second magnet and a side wall of the second yoke.

19. The speaker device of claim 16, wherein the first magnet comprising a north pole and a south pole, wherein the second magnet comprising a north pole and a south pole, and wherein the south pole of the first magnet is disposed on the first yoke and the north pole of the second magnet is disposed on the second yoke.

* * * * *